United States Patent
Harris

(10) Patent No.: US 6,222,458 B1
(45) Date of Patent: Apr. 24, 2001

(54) AUTOMATIC CELL PHONE DETECTION AT A COMBUSTIBLE DELIVERY STATION

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

(21) Appl. No.: 09/439,376

(22) Filed: Nov. 15, 1999

(51) Int. Cl.[7] .................................................. G08B 21/00
(52) U.S. Cl. .............................. 340/686.6; 340/825.06; 340/825.07; 455/422; 455/528
(58) Field of Search ................... 340/568.1, 506, 340/686.6, 691.1, 691.6, 825.06, 825.69, 825.07, 686.1; 455/421, 422, 66, 528

(56) References Cited

U.S. PATENT DOCUMENTS

| | | | |
|---|---|---|---|
| 4,321,653 | 3/1982 | Takahashi | 361/219 |
| 5,363,988 | 11/1994 | Saxton et al. | 222/14 |
| 5,442,805 | * 8/1995 | Sagers et al. | 455/33.1 |
| 5,774,787 | * 6/1998 | Leopold et al. | 455/12.1 |
| 5,819,171 | * 10/1998 | Hoogerwerf et al. | 455/410 |
| 5,825,606 | 10/1998 | Villain et al. | 361/220 |
| 5,851,108 | 12/1998 | Clymer et al. | 417/44.1 |
| 5,923,572 | 7/1999 | Pollock | 354/528.17 |
| 5,991,614 | * 11/1999 | Oura | 455/404 |
| 6,011,973 | * 1/2000 | Valentine et al. | 455/456 |

OTHER PUBLICATIONS

"Cell phones can ignite gasoline?", News from GEEK.com, pp. 1 and 2, Oct. 8, 1999.*

* cited by examiner

Primary Examiner—Jeffery Hofsass
Assistant Examiner—Toan Pham
(74) Attorney, Agent, or Firm—Scott C. Harris, Esq

(57) ABSTRACT

Protection against use of a two way radio, e.g. a cellular phone, at a combustible delivery station. One mode is active, and detects operating cell phones at the gas station. The phones can be detected using Bluetooth. The pump can be turned off when the alarm is detected. Another mode is passive. This mode can be via shielding, alone or with RF jamming.

20 Claims, 2 Drawing Sheets

AUTOMATIC CELL PHONE DETECTION AT A COMBUSTIBLE DELIVERY STATION

FIELD OF INVENTION

The present invention relates to automatic detection of radio devices at a station for delivery of combustible materials. More specifically, the present application describes techniques of detecting a cell phone at a gas station.

BACKGROUND

Concerns have recently been raised about the safety of cellular phones around combustible materials. At least one highly-publicized report has indicated that an operating cellular phone could cause an explosion at a gas station.

Defense against this issue could be difficult. Gas stations are often un-staffed, or minimally staffed. The attendants often stay within a burglary-protected area. The attendants are often not able or not motivated to adequately police whether a cellular phone or other radio transmitting device is being used.

SUMMARY

The present application teaches protection against use of a radio device, such as a cellular phone, at a combustible delivery station such as a gas station.

The protection can be via detection and/or prevention. Another aspect of the invention teaches automatic turn off of a cellular phone is also contemplated.

A first aspect uses a wireless protocol to detect an operating cellular phone.

BRIEF DESCRIPTION OF THE DRAWINGS

These and other aspects will now be described in detail with respect to the accompanying drawings, wherein.

DETAILED DESCRIPTION

A number of embodiments are described, each of which includes protection against use of a radio device, e.g. a cellular telephone, when the radio device is in proximity to a combustible delivery station, e.g, a gas station.

Figure 1:
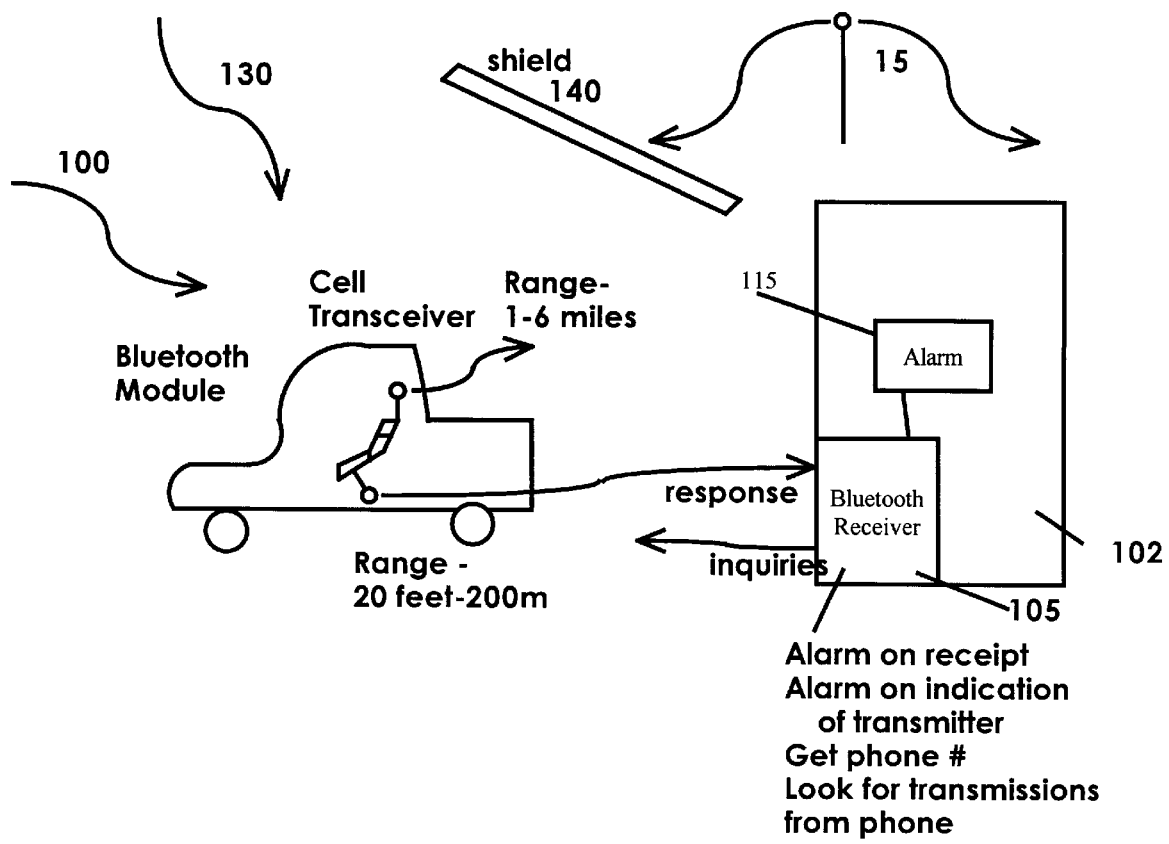
FIG. 1 shows a basic block diagram of the first embodiment which automatically detects a cellular telephone which is in use.

A first embodiment shown in FIG. 1 protects by automatic detection. In this embodiment, the cellular phone is a standard cellular telephone, e.g. IS-95, AMPS, CDMA, or GSM or other standard. The telephone also is equipped with a short range communicator, such as a Bluetooth (TM) transmitter. Bluetooth protocol is described in Bluetooth Specification, version 1.0, available at www.bluetooth.com. While Bluetooth is described herein as the preferred communication protocol, it should be understood that any other wireless communication protocols such as wireless LAN could be used for similar effect.

Either the entire perimeter of the gas station, or only portions of the perimeter of the gas station, can optionally be RF shielded. This helps ensure that only cellular telephones entering the gas station, and not those just passing the gas station, are detected.

In this embodiment, a central area 100, e.g. the area of the attendant station, has a Bluetooth transceiver device 105 therein. The Bluetooth transceiver 105 is preferably configured to send the messages, described herein, using Bluetooth's short range communication mode. In the short range mode, Bluetooth may transmit for a distance of, for example, 10 meters. The distance can also be adjusted, by adjusting the power output of the Bluetooth device, to avoid erroneous detection of passing cars, as compared with cars that actually enter the gas station. Another way of avoiding erroneous detection of passing cars is to require the Bluetooth acquisition to persist for, e.g. 90 seconds prior to establishing a detection.

The central transceiver 105 is continually sending Bluetooth inquiries, directed to all discoverable Bluetooth devices such as 110 within range. Each discoverable Bluetooth devices, responds to an inquiry by indicating its presence, and providing certain information such as its Bluetooth address, and its device type. The system monitors to detect a device type indicating a cellular telephone, or radio. The system can respond in different modes.

In an enhanced safety mode, all cellular telephones must actually be turned off upon entering the station. This avoids any incoming calls. An incoming call could actuate the phone ringer, causing the phone to ring and possibly causing the user to answer. Any detection of an active cellular telephone causes an alarm. The alarm is displayed as 115 in the central Bluetooth unit. This alarm can stop delivery of all fuel until the alarm is quashed. The termination of fuel delivery can be done automatically in response to a detection of an operating cellular phone, or can be manually effected by an attendant upon detecting the alarm.

In one mode, the system displays "pump stopped because of active cell phone device" on the gas pump(s). This prompts the owner of the cell phone to turn off the cell phone. After the cell phone is turned off, subsequent Bluetooth inquiries are negative, and gas pumping can be re-enabled.

Some Bluetooth phones may support automatic shutoff by Bluetooth, and if so, an automatic shutoff command may be sent.

In another mode, after receiving the indication of a Bluetooth device 120, the central Bluetooth transceiver 105 sends a page to the discovered Bluetooth device 120. The Bluetooth device 120 responds to the page, thereby establishing communications. At that point, the central device 105 can ask the Bluetooth device 120, e.g. cell phone, for certain status information. This can include an inquiry of whether the cell phone is transmitting or on a call. If the cell phone answers "yes" at that point, an alarm can be established. The alarm which can be handled as described above.

As a modification to the previously described embodiment, the paging channel can be maintained active until the cell phone 120 is turned off, at which time pumping can be resumed.

The above embodiment describes using Bluetooth, which is an intelligent wireless protocol that has addressed signals and responses to those addressed signals. Other intelligent wireless protocols can be used. It is also possible, however, to simply passively detect signals. The effectiveness of this system can be increased when coupled with a partial or complete radio shield around the station, as described herein.

At least a part of the perimeter of the gas station can be shielded. This shield 140 can be located in areas to block transmission from cellular repeaters 150. Another alternative is the shield can be formed from a plurality of separated shield parts form a shielding effect between the wires. The wires are located in areas where the autos need not enter or leave the station. The areas 130 where the autos enter and leave the station can be attenuated by the shielding effect of the wires. In this case, the wires are used to model a shielding effect along a plane of shielding. Alternatively, partial shielding can be used. When the automobile enters the gas station, it comes within at least partly the shielded area. The cell phone detection unit 102 scans the area for the presence of RF emissions of the type that would be emitted by the cellular radio portion, e.g., the local oscillator of a cellular phone. Upon detection of these emissions, an alarm is established. The alarm handling routine can proceed as described above.

In the first mode discussed above, any addressed system of communication can be used. In the second mode, any passive means of communication can be used. The detection of local oscillators is well known and is used, for example, for detecting unauthorized television reception in pay cable systems.

Another embodiment is also passive. Dangers from the cell phone is caused by RF communication. This embodiment prevents RF communication within the area of the gas station. This embodiment prevents all form of cell phone communication from occurring within the protected area. The embodiment shown in FIG. 2 uses an at least partly shielded area 200, with a roof 205 over the protected area. The roof is RF shielded, i.e., covered by copper mesh. Other shielding elements 210, 215 can be located in a predetermined pattern to provide RF shielding at predetermined areas inside the station. This effectively forms an RF shield that prevents most or all RF from the entering the station. By so doing, cell phone communication is at least significantly attenuated. Even if the user has their cell phone on, they will not be able to make or receive calls. If the user is on a call, the call will be terminated when they enter the RF protected area. The user may still have their cell phone on inside the station but the cell phone will be in a very low power, or "standby", consumption mode. Only the receive local oscillator will be operating. The phone is unable to receive a ring tone and unable to place a call.

Figure 2:
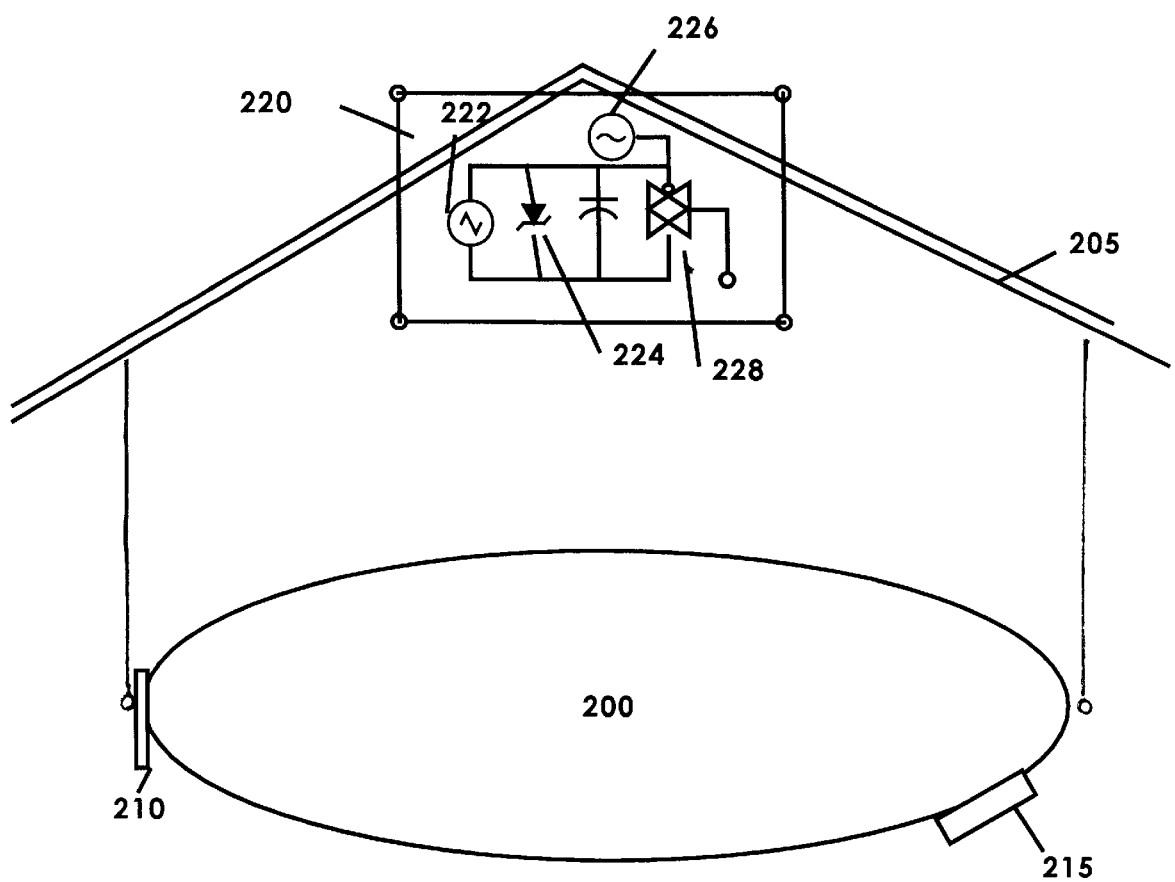
FIG. 2 shows a shielding embodiment.

Yet another modification of the FIG. 2 embodiment includes a short-range jammer 220 within the protected area 200. If a jammer is used, the shielding can be less complete. The jammer is placed close to the shield, e.g., under the shielded roof as shown.

The jammer operates by sweeping across all the cellular phone frequencies of interest. For example, a triangle wave generator 222 can be used to drive a varactor diode 224 configured as a tuner part, to sweep across all the frequencies. The jammer is driven by white or pink noise from noise generator 226. RF transmitter 228 transmits white or pink noise across the entire frequency band over which cellular phones transmit and receive.

The jammer preferably operates at a restricted power for two reasons. First, the power should be low enough so that the jamming effect does not extend outside the protected region. The power level can be adjustable, so that the total power output can be adjusted to jam within the desired area, and not jam outside the desired area. By so doing, cell phone traffic and communications are interrupted.

Second, the power may need to be low enough to avoid violating FCC or other comparable regulation.

This can be used by itself, with a partial RF shield, or with an improved RF shield. Even with an imperfect RF shield, the cell phone jammer could be useful since it could prevent cell phone communications.

In particular, this system could prevent incoming calls, preventing one of the concerns at a gas station—the incoming ring signal. Also, while communications might be possible, the call would likely be noisy and/or easily dropped, thereby frustrating the user.

Another embodiment of the above extends these teachings described above to use in other areas besides stations for delivery of combustible material. For example, the system described in the second embodiment would have special application in areas where cell phones are found by others to be annoying. This includes hospital emergency rooms, museums, houses of worship, and other such areas where cellular phones and pagers are though to be inappropriate.

Other modifications are contemplated. For example, while the present application has described the combustible material being gasoline, it should be understood that other combustible materials, such as propane, could also be protected in similar ways.

What is claimed is:

1. A system for protecting against two way radio use at a station for delivery of combustible material, comprising:

a two way radio protecting element, which automatically protects against use of a two way radio within said station for delivery of combustible material.

2. A system as in claim 1, wherein said radio is a cellular phone.

3. A system as in claim 1, wherein said radio protecting element includes a radio frequency shield.

4. A system as in claim 1, wherein said radio protecting element includes an RF jammer.

5. A system as in claim 1 wherein said protecting element includes a cell phone detector, which produces an alarm when a cellular phone is detected.

6. A system as in claim 1 wherein said protecting element is an addressed system, in which the two-way radio has a specific address, said two way radio protecting element detects said specific address to detect said two way radio.

7. A system as in claim 1 wherein said protecting element is a nonaddressed system.

8. A system for detecting two way radio use at a station for delivery of combustible material, comprising:

a two way radio detecting element, which detects use of a two way radio within said station for delivery of combustible material, and automatically produces an action in response to detecting said use of said two-way radio within said station.

9. A system as in claim 8 wherein said action is an alarm.

10. A system as in claim 8 wherein said action is automatically preventing combustible material from being delivered.

11. A system as in claim 8, wherein said radio detecting element includes a Bluetooth device.

12. A method of preventing use of a two way radio in a combustible material delivery station, comprising:

defining a perimeter of a combustible material delivery station; and protecting against said two way radio being used within said perimeter, at least while combustible material is being delivered.

13. A method as in claim 12, wherein said protecting comprises RF shielding said perimeter.

14. A method as in claim 12, wherein said protecting comprises RF jamming within said perimeter.

15. A method as in claim 14, wherein said jamming comprises adjusting a power level of jamming to an amount that allows jamming within said perimeter, but not outside said perimeter.

16. A method as in claim 12, wherein said protecting comprises detecting when a radio is active within said perimeter, and producing an alarm when active.

17. A method as in claim 16, further comprising, responsive to said alarm, automatically preventing dispensing of said combustible material.

18. A method as in claim 16, wherein said alarm provides an indication that is perceived by an attendant.

19. A method as in claim 12, wherein said detecting is via an addressable protocol.

20. A method as in claim 12, wherein said detecting is via a nonaddressable protocol.

* * * * *